UNITED STATES PATENT OFFICE.

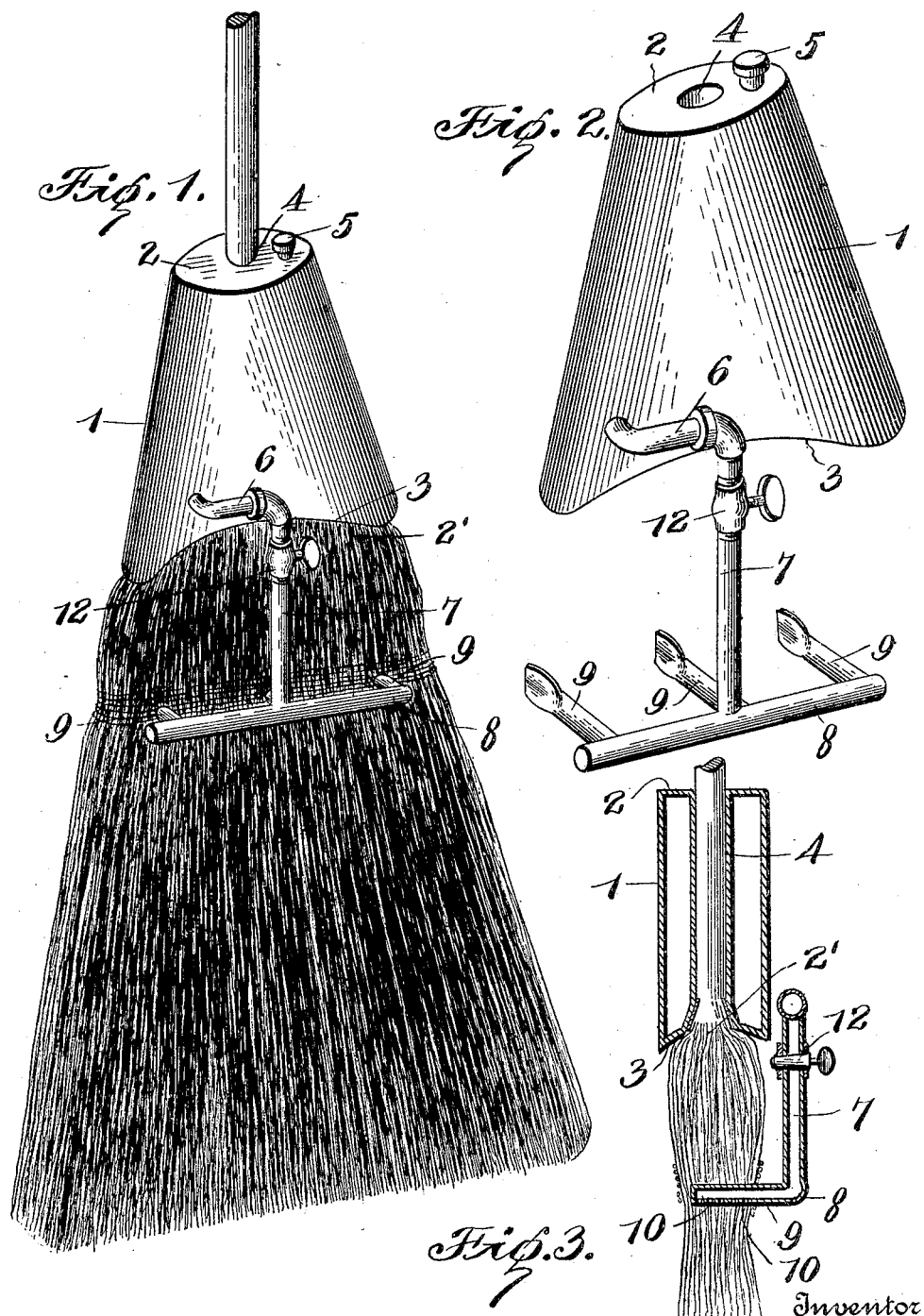

GEORGE M. STEWART, OF SISTERSVILLE, WEST VIRGINIA.

BROOM ATTACHMENT.

No. 804,066.  Specification of Letters Patent.  Patented Nov. 7, 1905.

Application filed December 29, 1904. Serial No. 238,829.

*To all whom it may concern:*

Be it known that I, GEORGE M. STEWART, a citizen of the United States, residing at Sistersville, in the county of Tyler and State of West Virginia, have invented certain new and useful Improvements in Broom Attachments; and I do declare the following to be a full, clear, and exact description of the invention, such as will enable others skilled in the art to which it appertains to make and use the same.

This invention relates to attachments for brooms.

The object of the invention is to provide a tank or other receptacle adapted to be arranged upon a broom and to have connected thereto means whereby a liquid contained in said tank may be evenly discharged upon the bristles or straws of the broom while the same is being used and which may be swung out of operative position when desired.

A further object is to provide a simple and inexpensive attachment of this character which may be quickly and easily attached to an ordinary house-broom, whereby water, oil, or other fluid may be supplied to the broom and by the same applied to the floor or surface to be swept by the broom and which may be swung out of operative position when desired.

With these and other objects in view the invention consists of certain novel features of construction, combination, and arrangement of parts, as will be hereinafter described and claimed.

In the accompanying drawings, Figure 1 is a perspective view of a broom, showing the application of the invention to the same. Fig. 2 is a similar view of the device removed from the broom. Fig. 3 is a vertical sectional view through the device, showing the same in position upon a broom.

In the embodiment of my invention I provide a tank or receptacle 1, which is preferably of flat triangular shape, the edges of the same being rounded. The receptacle 1 is provided with a flattened upper end 2 and a curved lower end or bottom 3, which is adapted to conform somewhat to the shape of the upper end of the broom-head 2. In the receptacle 1 is arranged a centrally-disposed tube 4, which opens through the top and bottom of said receptacle, and through said tube is adapted to project the handle of the broom upon which the same is applied. The upper end of the receptacle is provided with a filling-opening which is normally closed by a cap 5. To one side of the receptacle, near the lower end of the same, is connected a short horizontally-disposed pipe 6, which extends to the center of said side of the receptacle, and to the end of said pipe 6 is pivotally connected the upper end of a vertically-disposed pipe 7. The pipes 6 and 7 are connected by a loose elbow-fitting which permits the pipe 7 to be swung outwardly upon the end of the pipe 6 whenever desired to use the broom without the fountain attachment. To the end of the pipe 7 is connected a horizontally-disposed cross-pipe 8, which projects on both sides of the pipe 7 across the side of the broom-head. The pipe 8 is closed at its ends and is provided along its length with a series of short laterally-projecting pipes or nipples 9, which are pointed at their outer ends to permit the same to be forced into the broom-head, the length of the pipe 7 being such as to bring the cross-pipe 8 to about the middle of the broom-head. On the under side of the pipes or nipples 9 is formed a series of discharge openings or perforations 10, through which the liquid from the tank or receptacle 1 is discharged onto the straws or bristles of the broom. In the pipe 7, near the upper end of the same, is arranged a valve 12, by which the flow of liquid from the receptacle 1 may be controlled.

In using the device the pipe 7 is swung laterally and the broom-handle inserted through the receptacle 1, which is slipped down into engagement with the upper end of the broom-head, after which the pipe 7 is swung down into engagement with the side of the broom-head and the pipes or nipples 9 forced into or between the straws of the head. The valve 12 may now be turned on to the desired degree to permit the proper flow of liquid from the tank to said nipples 9, by which it will be evenly distributed onto the straws or bristles of the broom-head, by which it will be applied to the floor or other surface being swept. The device may be used for applying any suitable liquid and will be found to be particularly efficient in supplying water in such quantities as to lay the dust raised from the sweeping operation.

While I have shown and described a particular form of receptacle and manner of applying the same, it is obvious that I may use other forms or receptacles and a different manner for connecting the same with the broom. The yielding connection between the pipe 7 and the pipe 6 of the tank permits the pipe 7 to yield or give with the bending of the broom-straws forming the head of the broom while the same is being used, thus preventing said parts from becoming broken or disengaged.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A fluid-supplying attachment for brooms, consisting of a receptacle, having arranged through its center a vertically-disposed tube to receive the handle of the broom, a jointed feed-pipe connected with said tank, a cut-off valve arranged in said pipe, means for swinging the feed-pipe out of operative position, and perforated discharge-nipples connected to the lower end of the same, substantially as described.

2. A fluid-supplying attachment for brooms, consisting of a receptacle shaped to conform to the upper end of the broom-head, a tube arranged through the center of said tank to receive the handle of the broom, a short horizontal section of pipe connected to the lower end of the tank, a feed-pipe pivotally connected to said short pipe to turn laterally thereon, a cross-pipe arranged on the lower end of said feed-pipe, laterally-projecting perforated nipples connected to said cross-pipe, said nipples being provided with pointed ends to permit the same to be forced into the head of the broom, and a cut-off valve arranged in said feed-pipe to control the flow of liquid through the same, substantially as described.

In testimony whereof I have hereunto set my hand in presence of two subscribing witnesses.

GEO. M. STEWART.

Witnesses:
   G. L. LOWTHER,
   J. M. GOLD.